H. J. KUHLMAN.
MEANS FOR SHIFTING GANG FRAMES OF CULTIVATORS.
APPLICATION FILED APR. 7, 1915.
1,169,839.
Patented Feb. 1, 1916.
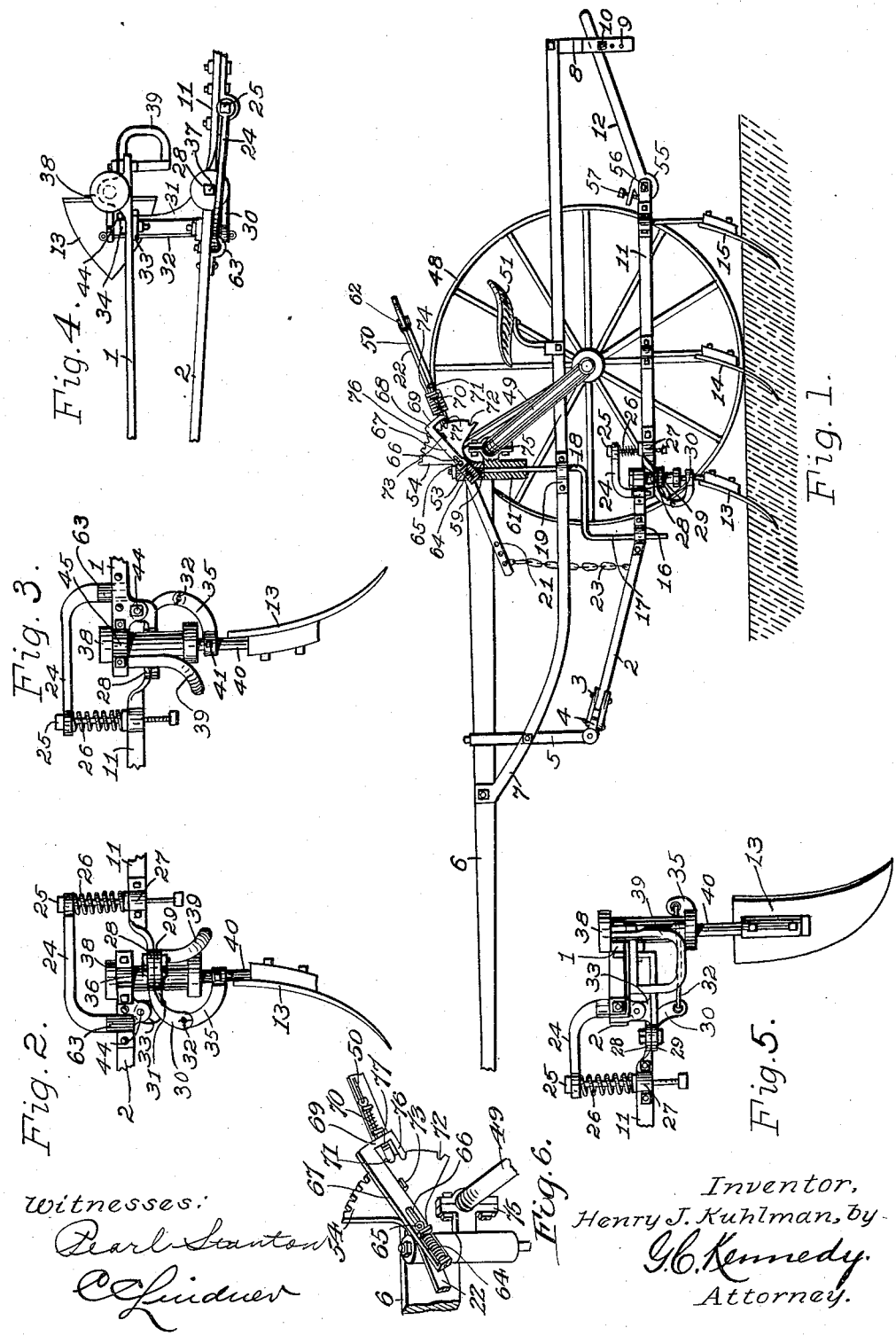
Witnesses:
Pearl Stanton
C. Lindner
Inventor,
Henry J. Kuhlman, by
G.C. Kennedy.
Attorney.
THE COLUMBIA PLANOGRAPH CO., WASHINGTON, D. C.

UNITED STATES PATENT OFFICE.

HENRY J. KUHLMAN, OF COLESBURG, IOWA, ASSIGNOR TO KUHLMAN & HOLSCHER MANUFACTURING COMPANY, OF WATERLOO, IOWA.

MEANS FOR SHIFTING GANG-FRAMES OF CULTIVATORS.

1,169,839.  Specification of Letters Patent.  Patented Feb. 1, 1916.

Application filed April 7, 1915. Serial No. 19,666.

*To all whom it may concern:*

Be it known that I, HENRY J. KUHLMAN, a citizen of the United States of America, and a resident of Colesburg, Delaware county, Iowa, have invented certain new and useful Improvements in Means for Shifting Gang-Frames of Cultivators, of which the following is a specification.

My invention relates to improvements in cultivators, and the object of my improvement is to supply means for operating the movably connected parts of sectional shovel gang-frames thereof in different directions and also relatively to each other.

This object I have accomplished by the means which are hereinafter described and claimed, and which are illustrated in the accompanying drawings, in which:

Figure 1 is a side elevation of a cultivator, containing movably connected sectional gang-frames, with my improved operating-means therefor, parts being sectioned away. Fig. 2 is an enlarged detail side elevation of the jointed connections between the forward and the intermediate sections of one of the gang-frames. Fig. 3 is a side elevation of the reverse of the parts shown in said Fig. 3. Fig. 4 is an enlarged top plan view of the parts shown in Figs. 3 and 4. Fig. 5 is a rear oblique elevation of the parts shown in Figs. 3 to 5, inclusive. Fig. 6 is a perspective detail view of part of the shifting-means for the gang-frames.

Similar numerals of reference denote corresponding parts throughout the several views.

The cultivator shown has a tongue 6 mounted in the main-frame bars 7, the latter extending rearwardly and parallel to a location in the rear of the pair of carrying wheels 48, the latter being rotatably mounted on the spindles of the bowed axle 49, whose bowed part is medially secured to the rear part of the tongue.

A bent cross-bar 5 secured medially to the tongue has its oppositely extended downwardly bent parts secured to the frame-parts 7 and dropped to provide spindles upon which are mounted the rock-bodies 4, which, with the pivot-bolts 3, form universal couplings whereby the forward parts 1—2 of the gang-frame sections are pivotally connected to said spindles for both lateral and up and down swinging movements.

A cross-bar is mounted across the frame-bars 7 and carries a driver's seat 51, while below the level of the said frame-bars are located a pair of sectional gang-frames, which are placed on opposite sides of the medial longitudinal line of the cultivator.

Each gang-frame comprises the sections 1—2, and laterally-bent section 11, which have the shovels 13, 14 and 15 mounted in echelon therein in proper relation laterally and longitudinally, so that the middle shovel 14 is under the axis of and between the carrying-wheels, with the shovels 13 and 15 located forwardly and rearwardly respectively of said axis. The forward gang-frame section is made up of the rigidly connected rearwardly divergent bars 1 and 2, rigidly spaced and secured at their rear ends by a cross-bar 33 and bolts 34. Under the cross-bar 33 another cross-bar 31 shown in Figs. 4 and 5 is pivotally connected at its upturned ends to said bars 1 and 2 by means of pintle-bolts 44 to rock up and down and has a disk-shaped part 29 projecting horizontally therefrom, as shown in Fig. 4. The bar 11 of the rear gang-frame section has a similar disk-shaped part 28 on its forward end, which overlies the other disk 29 in registration, and both disks are centrally orificed to receive a pintle-bolt 37, whereby the gang-frame sections are pivotally connected to swing laterally relative to each other.

The rear part of the bar 2 has a socket 63 in which is pivotally mounted the lower end of an arm 24 which is bent over horizontally and rearwardly to overhang the forward part of said bar 11 and orificed to seat the upper end of a headed bolt 25 which is passed downwardly and slidably through a bearing 27 on the bar 11. Said bolt extends downwardly a distance below the bar 11 and has an adjustable stop-nut on its threaded lower end, while a coiled compression-spring 26 is seated about said bolts and engaged between the bar 11 and arm 24. The arm 24 thus forms a pivotal connection between the sections 2 and 11, the spring 26 tending to yieldingly thrust them apart, which thus maintains them in desired positions.

Upon the rear end of the bar 1 is mounted a cylindrical bearing-body 38 in a clamp 45 and in whose central hollow is secured a depending hanger or shank 40, upon whose lower end the forward shovel 13 is detachably mounted. A stirrup 39 is also mounted on the rear end of said bar 1. The numeral 35 denotes an upwardly-curved arm secured by a set-screw 41 on the shank 40 and is at its tip transversely orificed to receive one end of a transverse rod 32 the other end of which is secured in an orifice in another arm 30, which latter is fixedly projected from the disk 28 to be parallel with the arm 35. This rod 32 forms a linking connection between the shank 40 and the bar 11, and capable of some relative movement thereto.

The rear laterally bent section 11 has the middle shovel 14 secured on a shank depending from its middle part, while a like rear shovel 15 is likewise secured on a shank depending from its rear part. The rear end of the bar 11 is forked, with a disk-shaped part 55 of a rearwardly extending bar 12 seated pivotally on a pintle 56 between the forks. The disk 55 has a downwardly-orificed forwardly-projecting finger, with a set-screw 57 passed through its orifice to engage the top of the bar 11, whereby the obliquity of the bar 12 may be adjusted, the disk then being rigidly clamped in said forks by means of the nut upon the pintle-bolt 56. On the rear end of each frame-bar 7 is a depending hanger 8 having its lower end offset and provided with an opening in which the rear end of the arm 12 is movably seated to rock up and down when the gang-frame is moved up and down, and having an adjustable bolt 10 set in one or other of the orifices 9 whereby an adjustment vertically may be made.

I have adopted the following means for shifting the gang-frames laterally, or up and down. A pair of levers 22 are used for this purpose, each lever being mounted to swing either up and down or sidewise. Each lever is pivoted on a pintle to a rack-sector 54, the latter being integral with a cylindrical body 53 having a vertical squared hollow in which the upper squared end 59 of the rock-shaft 18 is detachably secured. The forward end of the lever has a row of orifices 21, in either of which one end of a chain 23 is adjustably secured, the lower end of the chain being attached to the rear part of the bar 2. The body 53 is supported to rock horizontally on the top of a cylindrical body 61, the latter fixed detachably to the middle horizontal part of the upwardly bowed axle 49 by means of a pair of clamps 75 of which one is an integral part of said cylindrical body. Said body 61 has a vertical cylindrical hollow through which the shaft 18 is passed to rock therein. The lever 22 has a sliding detent 71 movable through orifices in spaced cross-pieces thereon, and having a coiled spring 70 seated thereabout and adapted to move the free end of the slide to engage any of the teeth on the upper part of the sector 54. A finger piece is pivotally connected to said lever, and a connecting rod 50 operatively connects the finger piece to said detent. The numeral 67 denotes a lever both pivotally and slidably connected to the sector 54 on a pintle 65 projected into a longitudinal slot 66 in the lever. A compression spring 64 is connected between one end of said lever and the pintle 65. The lever 67 has a downwardly bent end 69 adapted to pass over a pin 77 on the slide detent 71 when the latter is located adjacent to the upper part of said sector 54. A fixed stud 73 on said sector limits the downward movement of the lever 67. Said lever 67 has a fixed laterally offset detent 76 adapted to be engaged with any of the teeth on the upper part of said sector. The lower part of said sector is unprovided with teeth except at its lower angle where it has a root cavity 72 with which the detent 71 may be detachably engaged when said lever 22 is shifted to its lowermost position.

To shift the shovel carrying gang frames from side to side, the lever 22 is simply rocked from side to side, since its supporting means its adapted to rock on the fixed support 61, and this rocks the rock-shaft 18 whose crank 17 swings the gang-frames laterally. The driver may operate the stirrups 39 conjointly with the levers 22 in the management and control of said gang-frames. Either lever 22 may be rocked vertically over its rack-sector to cause its chain connection 23 to raise or lower the forward gang-frame section 1—2, the pivotally connected gang-frame section 11 and its rearwardly projecting bar 12 being also raised or lowered, the bar 12 being slidably fulcrumed in the bearing 9. The pivotally-connected sections thus are, when in their lowered positions shown in Fig. 1, located with their shovels inserted at the depth in the ground. When it becomes necessary for the forward shovel 13 to clear a hill of corn when the latter is misplaced, the lever 22 may be used to swing upwardly the section 1—2 whereby the forward end of the section 11 is likewise swung up sufficiently to lift the shovel 15 from the ground without entirely removing the other shovels 14 and 15 from the soil, and so these latter shovels may cultivate along their rows without interruption. The teeth in the upper part of the rack-sector 4 are used in conjunction with the lever 22 to adjust the depths of the shovels in the ground, the lower root openings 72 of the sector being used only when the lever is pushed down far enough to lift the shovels entirely clear of the ground. The auxiliary lever 67 is used as a locking means for the detent 71 of said lever 22, when said detent is engaged with any of the uppermost teeth of said rack-sector to adjust the depth of cut of the shovels. This is effected in the following manner: When the lever 22 has been swung upwardly enough to locate the pin 77 of said detent under the angular part 69 of the lever 67 and the finger piece moved to withdraw the detent 71 out of engagement with the rack sector, the pin 77 engages and pulls upwardly the lever 67 while compressing the spring 64. The lever 22 may then be shifted upwardly, carrying the lever 67 along, and when the finger piece is released, the detent 76 on the lever 67 will engage teeth on said sector due to the reaction of the spring 64 at the same time that the detent 71 is engaged with said sector by the reaction of the spring 70. This device safely locks the parts in their adjusted position, without any extra effort on the part of the driver.

The spring 26 acts upon the gang frame-bar 11 to normally keep it level except when swung upwardly by said lever, and this maintains all the shovels in their desired positions. The adjustable connection between the bars 11 and 12 at 55 and 57 permits proper relative adjustment of the rear part of the frame 11 so that the rear shovel 15 may conveniently act and be removed from the ground.

Since the connection of the crank 17 is with the forward section 1—2, the arc of movement of the forward shovel 13 is greater than those of the other shovels which gives a better control of same and their sidewise movements and with a larger scope.

Having described my invention, what I claim as new, and desire to secure by Letters Patent, is:

In a cultivator, a movable gang-frame, and shifting-means therefor, comprising a rock-body mounted to rock horizontally and having fixed bearing-studs, a hand-lever pivoted on one of said studs to rock vertically, a flexible connection between one end of said lever and said gang-frame adapted to transmit vertical movements thereto, a crank connection between said rock-body and said gang-frame adapted to rock the latter laterally when the lever is swung sidewise in either direction, and a lever slidably pivotally mounted on the other of said bearing-studs, a rack-sector fixed on said rock-body, and said levers each having a detent which are adapted to be detachably engaged with teeth on said sector, said levers each having engaging-means adapted for occasional engagement with each other, to permit both said detents to become detachably engaged with teeth on said sector, when the movable detent on the first-mentioned lever is actuated to and from said sector to become engaged or disengaged with it.

Signed at Colesburg, Iowa, this 24th day of March 1915.

HENRY J. KUHLMAN.

Witnesses:
  W. H. BRUNN,
  GEO. C. KENNEDY.

Copies of this patent may be obtained for five cents each, by addressing the "Commissioner of Patents, Washington, D. C."